United States Patent
Ha et al.

(10) Patent No.: US 12,043,267 B2
(45) Date of Patent: Jul. 23, 2024

(54) METHOD AND APPARATUS FOR PROVIDING INFORMATION

(71) Applicants: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

(72) Inventors: Jae Jun Ha, Hwaseong-si (KR); Gu Min Jeong, Seoul (KR); Hyun Jung Oh, Seoul (KR); Seung Hyeon Lee, Seoul (KR)

(73) Assignees: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 259 days.

(21) Appl. No.: 17/404,665

(22) Filed: Aug. 17, 2021

(65) Prior Publication Data
US 2022/0055633 A1    Feb. 24, 2022

(30) Foreign Application Priority Data

Aug. 21, 2020   (KR) .................. 10-2020-0105655
Apr. 23, 2021   (KR) .................. 10-2021-0052736

(51) Int. Cl.
*B60W 40/09*    (2012.01)
*B60W 40/08*    (2012.01)
*B60W 50/12*    (2012.01)
*B60W 50/14*    (2020.01)
*G08G 1/01*     (2006.01)

(52) U.S. Cl.
CPC ............ *B60W 40/09* (2013.01); *B60W 50/12* (2013.01); *B60W 50/14* (2013.01); *G08G 1/0129* (2013.01); *G08G 1/0145* (2013.01); *B60W 2040/0872* (2013.01); *B60W 2050/146* (2013.01)

(58) Field of Classification Search
CPC ...... B60W 50/14; B60W 40/09; B60W 50/12; B60W 2040/0872; B60W 2050/146; G08G 1/0129; G08G 1/0145
See application file for complete search history.

(56) References Cited

U.S. PATENT DOCUMENTS

| | | | |
|---|---|---|---|
| 9,869,556 B2 * | 1/2018 | Jung .................. | G04G 21/02 |
| 10,104,460 B2 * | 10/2018 | Boesen ............... | H04R 1/1016 |
| 10,595,175 B2 * | 3/2020 | Ramalho de Oliveira ................... G08G 1/0112 | |
| 10,717,444 B1 * | 7/2020 | Chan .................. | B60W 50/14 |
| 10,873,837 B2 * | 12/2020 | Tran ................... | H04Q 9/00 |

(Continued)

*Primary Examiner* — Luis A Martinez Borrero
(74) *Attorney, Agent, or Firm* — Lempia Summerfield Katz LLC

(57) ABSTRACT

A method and apparatus for providing information are disclosed. An information providing apparatus includes an output unit configured to output information and a control unit configured to generate first information and second information according to an output mode that is any one mode of a normal mode, a safe mode, or an emotional mode. The output unit controls the first information to be output to a user through the output unit and controls the second information to be output to an outside of the information providing apparatus.

11 Claims, 6 Drawing Sheets

(56) References Cited

U.S. PATENT DOCUMENTS

| | | | | |
|---|---|---|---|---|
| 10,967,873 B2* | 4/2021 | Sobhany | ............... | B60W 50/16 |
| 11,080,993 B1* | 8/2021 | Shuman | ................. | H04W 4/40 |
| 11,117,595 B2* | 9/2021 | Sasaki | .................. | G06V 20/582 |
| 11,331,508 B1* | 5/2022 | Cowan | ................. | A61N 1/3968 |
| 11,812,808 B2* | 11/2023 | Morgan | ................... | A61B 5/11 |
| 2015/0238143 A1* | 8/2015 | Meurer | ................... | A61B 5/11 |
| | | | | 600/595 |
| 2016/0061613 A1* | 3/2016 | Jung | ................. | G01C 21/3632 |
| | | | | 701/538 |
| 2016/0207539 A1* | 7/2016 | Jung | ................... | G02B 27/017 |
| 2017/0318360 A1* | 11/2017 | Tran | ....................... | G06V 40/28 |
| 2018/0018899 A1* | 1/2018 | Okumura | ............ | A61B 5/0022 |
| 2018/0376305 A1* | 12/2018 | Ramalho de Oliveira | ................. | |
| | | | | H04W 4/44 |
| 2019/0026796 A1* | 1/2019 | Dinis da Silva de Carvalho | ........ | |
| | | | | G06Q 50/40 |
| 2019/0068434 A1* | 2/2019 | Moreira da Mota | ... | H04L 41/40 |
| 2020/0004242 A1* | 1/2020 | Kim | ..................... | H04L 67/125 |
| 2020/0214559 A1* | 7/2020 | Krueger | ................. | A61B 5/163 |
| 2020/0237318 A1* | 7/2020 | Gruentzig | ............. | A61B 5/747 |
| 2020/0261022 A1* | 8/2020 | Gruentzig | ............ | A61B 5/6804 |
| 2020/0329801 A1* | 10/2020 | Ciccaglione | ............. | A42B 3/22 |
| 2020/0367821 A1* | 11/2020 | Redshaw | ............ | A61B 5/4875 |
| 2021/0005071 A1* | 1/2021 | Sharma | ................ | A61B 5/1121 |
| 2021/0030097 A1* | 2/2021 | Morgan | ............... | A61B 5/6803 |
| 2021/0156529 A1* | 5/2021 | Selevan | ................... | F21L 2/00 |
| 2021/0327260 A1* | 10/2021 | Shuman | ............... | H04W 4/023 |
| 2022/0005291 A1* | 1/2022 | Konrardy | ......... | B60W 60/0015 |
| 2022/0211134 A1* | 7/2022 | Launes | ................ | A61B 5/6803 |
| 2022/0262236 A1* | 8/2022 | Ueno | ..................... | G06V 20/20 |
| 2022/0319329 A1* | 10/2022 | Kim | ..................... | B60W 40/04 |

* cited by examiner

METHOD AND APPARATUS FOR PROVIDING INFORMATION

CROSS-REFERENCE TO RELATED APPLICATION

This application is based on, and claims priority to, Korean Patent Application Number 10-2020-0105655 filed on Aug. 21, 2020 and Korean Patent Application Number 10-2021-0052736 filed on Apr. 23, 2021, the disclosures of which are incorporated by reference herein in their entirety.

TECHNICAL FIELD

The present disclosure relates to an information providing apparatus for providing information not only to a user but also to others. More particularly, the present disclosure relates to an information providing apparatus for providing different information to a user and others according to various modes and relates to a method of controlling the same.

BACKGROUND

The contents described in this section merely provide background information for the present disclosure and does not constitute the related art.

Recently, as a moving means or a transportation means, the proportion of vehicles is decreasing and the proportion of personal mobility vehicles (PM vehicles) is gradually increasing. Here, the PM vehicle refers to a moving object and to a moving means including an electric kickboard, a bicycle, a bike, a smart car, a vehicle, a purpose-built vehicle (PBV), an air vehicle, and the like.

Since the PM vehicle is smaller in size than the standard vehicles or bikes and is easy to store, the PM vehicle is frequently used on narrow roads, which vehicles cannot enter. The PM vehicles have high accessibility to users but have limitations in receiving various types of content compared to vehicles. For example, users of vehicles may use various types of content, such as playing music, navigation guidance, and making calls. On the other hand, users of PM vehicles may be provided with only a function of moving when using the PM vehicles and have difficulty in receiving other types of content.

Meanwhile, the usage of helmets by users of PM vehicles has recently increased due to safety and legal regulations. In order to increase convenience as the usage of the helmets increases for the users of PM vehicles, technologies that provide various functions to users through helmets equipped with cameras, brain wave sensors, and speakers are being developed. In other words, the helmet is studied as a safety device and an information providing apparatus.

However, various types of content are provided only to helmet wearers and research on technology for providing information to others is insignificant. Accordingly, there is a need for a function capable of providing useful information not only to helmet wearers but also to others and capable of providing different information to the wearers and others.

In addition, there is a problem in that a type of information provided by the information providing apparatus is determined at the time of manufacturing the information providing apparatus. Thus, appropriate information may not be provided depending on the position of the information providing apparatus.

Therefore, there is a need for research on an information providing apparatus capable of providing information not only to the user of the information providing apparatus but also to others and providing appropriate information according to the position of the information providing apparatus.

SUMMARY

According to at least one embodiment, the present disclosure provides an information providing apparatus. The apparatus comprises an output unit configured to output information and a control unit. The control unit is configured to generate first information and second information according to an output mode that is any one mode of a normal mode, a safe mode, or an emotional mode. The control unit is also configured to control the first information to be output to a user through the output unit and control the second information to be output to an outside of the information providing apparatus.

According to another embodiment, the present disclosure provides a method of operating an information providing apparatus. The method comprises generating first information and second information according to an output mode that is any one of a normal mode, a safe mode, or an emotional mode. The method also comprises outputting the first information to a user and outputting the second information to an outside of an information providing apparatus.

DETAILED DESCRIPTION

Figure 1:
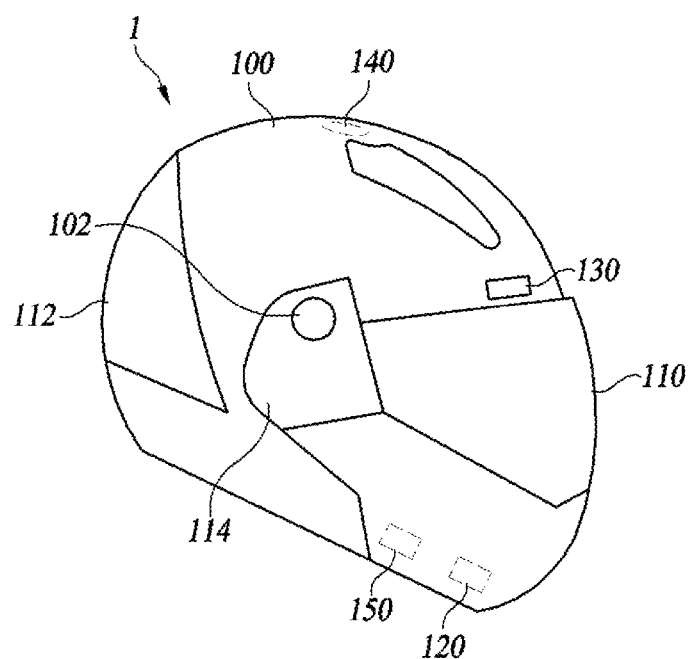
FIG. 1 is a diagram of an information providing apparatus according to an embodiment of the present disclosure.

Embodiments of the present disclosure provide an information providing apparatus for providing information not only to a user of the information providing apparatus but also to others and for providing different information to the user and others. Embodiments of the present disclosure also provide a method of controlling the same.

Other embodiments of the present disclosure provide an information providing apparatus for determining various modes according to a position of the information providing apparatus and for providing appropriate information to a user and others according to various modes. Other embodiments of the present disclosure also provide a method of controlling the same.

Hereinafter, some embodiments of the present disclosure are described with reference to the drawings. It should be noted that in giving reference numerals to components of the accompanying drawings, the same or equivalent components are denoted by the same reference numerals even when the components are illustrated in different drawings. In describing the present disclosure, when determined that a detailed description of related known functions or configurations may obscure the subject matter of the present disclosure, the detailed description thereof has been omitted.

In addition, in describing the components of the present disclosure, terms such as first, second, A, B, (a), (b), etc. may be used. These terms are used only in order to distinguish any component from other components. Features, sequences, or the like, of corresponding components are not limited by these terms. Throughout the present specification, unless explicitly described to the contrary, "including" and "comprising" any components should be understood to imply the inclusion of other elements rather than the exclusion of any other elements. A term, such as "part," "module," or the like described in the specification, means a unit of processing at least one function or operation and may be implemented as hardware, software, or a combination of hardware and software. When a component, device, element, or the like of the present disclosure is described as having a purpose or performing an operation, function, or the like, the component, device, or element should be considered herein as being "configured to" meet that purpose or to perform that operation or function.

Hereinafter, a Personal Mobility Vehicle (hereinafter referred to as PM vehicle) means a moving object. Examples of the PM vehicle include a micro mobility vehicle, an electric bicycle, an electric kickboard, an electric scooter, an electric wheelchair, an electric bike, a Segway, a 2-wheel drive vehicle, a smart car, a shuttle, a personal moving means, a personal flying means, a smart mobility vehicle, a shared mobility vehicle, first mile vehicle, last mile vehicle, a Purpose Built Vehicle (PBV), a personal air vehicle (PAV), a vehicle, an electric vehicle, or the like.

In addition, an intelligent transport system (ITS) includes road side units (RSUs) or mobile communication base stations. All of the RSUs or the mobile communication base stations perform broadcasting and may support a communication method, such as unicast or multicast if necessary. Hereinafter, the RSUs are described on the basis of performing a vehicle to everything (V2X) communication with a personal mobility vehicle (PM vehicle), but the present disclosure is not limited thereto. LTE-V2X, C-V2X, 5G-V2X, wireless access in vehicular environment (WAVE), dedicated short range communication (DSRC), or the like may be used. In other words, communication protocols used in the ITS may be used.

FIG. 1 is a diagram of an information providing apparatus according to an embodiment of the present disclosure.

Referring to FIG. 1, an information providing apparatus 1 includes an outer shell 100, a gear 102, a first output unit 110, a second output unit 112, a third output unit 114, a communication unit 120, a bio-signal receiving unit 130, a shock sensing unit 140, and a control unit 150.

In FIG. 1, the information providing apparatus 1 is described as a helmet, but the information providing apparatus 1 may be any one of a terminal, a smart phone, a wearable device, or a helmet. In addition, as long as the information providing apparatus 1 is an apparatus in which an interface for outputting information to a user and an interface for outputting information to others are divided, the information providing apparatus 1 may be implemented in any form.

The helmet is a device that a user wears on his/her head to protect his/her head. The helmet may accommodate the user's head and is formed to protect the accommodated user's head. Types helmets may be classified into helmets for PM vehicles, helmets for motorcycles, helmets for bicycles, helmets for skateboards, helmets for skis, helmets for skates, and safety helmets according to uses.

The outer shell 100 mitigates a shock applied to a user when a helmet and an object collide. In addition to the outer shell 100, the information providing apparatus 1 may further include layers for absorbing shock, such as a comfort liner and an inner shell. The layers may include a Styrofoam (EPS) layer that is light, has excellent shock absorption, is easily molded, and exhibits stable performance regardless of temperature, such as high and low temperatures.

The gear 102 is mounted on the outer shell 100 and is a component constituting a shaft about which the first output unit 110 moves.

The first output unit 110 is a component that provides information to a user. When the information providing apparatus 1 is the helmet, the first output unit 110 may be implemented as a display combined with a visor or a shield of the helmet. When the first output unit 110 is the visor including the display, the visor protects a user's face in the event of a collision and secures a user's view while moving. The visor is made of a transparent material and may further include a film for blocking ultraviolet rays or glare. In addition, the visor may be implemented as a visor, the color or transparency of which automatically may change according to illuminance using a chemical or electrical method.

The second output unit 112 and the third output unit 114 are components that provide information to others. The second output unit 112 and the third output unit 114 may also be implemented in the form of a display. In FIG. 1, the second output unit 112 is illustrated as a rear display of the information providing apparatus 1 but may be implemented at any position capable of providing information to others. In addition, the third output unit 114 may be a component that is positioned on a side surface of the information providing apparatus 1 and outputs information to others by voice.

The pieces of information output from the first output unit 110, the second output unit 112, and the third output unit 114 vary according to an output mode of the information providing apparatus 1.

The communication unit 120 is a component that performs wired/wireless communication with an ITS.

The communication unit 120 may include one or more components that enable communication with an external device and may include, for example, at least one of a short range communication module, a wired communication module, or a wireless communication module.

The short range communication module may include various short range communication modules that transmit/receive a signal using a wireless communication network in a short range, such as a Bluetooth module, an infrared communication module, a radio frequency identification (RFID) communication module, a wireless local access network (WLAN) communication module, a near field communication (NFC) module, and a ZigBee communication module.

The wired communication module may include various cable communication modules, such as a universal serial bus (USB) module, a high definition multimedia interface (HDMI), a digital visual interface (DVI), recommended standard 232 (RS-232), power line communication, or plain old telephone service (POTS) as well as various wired communication modules, such as a local area network (LAN) module, a wide area network (WAN) module, or a value added network (VAN) module.

The wireless communication module may include a wireless communication module supporting various wireless communication methods, such as global system for mobile communication (GSM), code division multiple access (CDMA), wideband code division multiple access (WCDMA), a universal mobile telecommunications system (UMTS), time division multiple access (TDMA), long term evolution (LTE), and new radio (NR) in addition to V2X, cellular-V2X (C-V2X), wireless access in vehicle environment (WAVE), dedicated short range communication (DSRC), a Wi-Fi module, and a wireless broadband module.

The bio-signal receiving unit 130 is a component that receives a user's bio-signal.

The bio-signal receiving unit 130 may detect brain wave information, blood flow information, blood pressure information, oxygen saturation, carbon dioxide saturation, pulsation, a respiration rate, a respiratory volume, and the like of a user. The bio-signal receiving unit 130 is positioned inside the helmet to come into contact with the user's head. When receiving the brain wave, the bio-signal receiving unit 130 may be in contact with a skin of a head adjacent to a frontal lobe responsible for memory and thinking and receive the brain wave generated from the frontal lobe.

The shock sensing unit 140 is a component that detects a shock when the information providing apparatus 1 collides with an object. The shock sensing unit 140 may be implemented at a position capable of efficiently detecting a shock.

The control unit 150 is a component that controls the first output unit 110, the second output unit 112, the third output unit 114, the communication unit 120, the bio-signal receiving unit 130, and the shock sensing unit 140.

Figure 2:
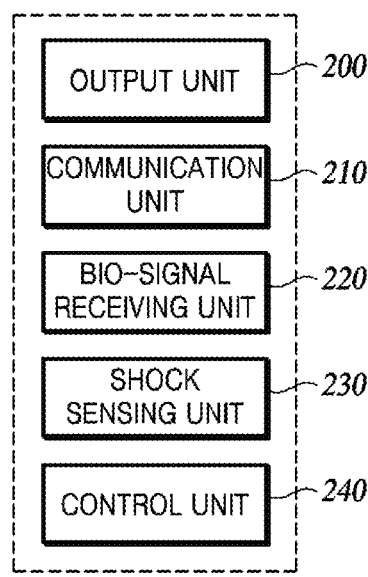
FIG. 2 is a configuration diagram of the information providing apparatus according to the embodiment of the present disclosure.

FIG. 2 is a configuration diagram of the information providing apparatus according to the embodiment of the present disclosure.

Referring to FIG. 2, the information providing apparatus 20 may include an output unit 200, a communication unit 210, a bio-signal receiving unit 220, a shock sensing unit 230, and a control unit 240. In addition, the information providing apparatus may further include a storage unit (not illustrated).

The information providing apparatus 20 may be implemented as a terminal, a smart phone, a wearable device, a helmet, and the like.

The output unit 200 is a component that outputs information of the information providing apparatus.

The output unit 200 respectively includes an interface for providing information to a user and an interface for providing information to others.

The output unit 200 may be implemented as at least one of a liquid crystal display (LCD), a thin film transistor-liquid crystal display (TFT LCD), an organic light-emitting diode (OLED), a flexible display, a three-dimensional (3D) display, a transparent display, a head-up display (HUD), a touch screen, or a cluster.

The communication unit 210 is a component that communicates with the ITS. The communication unit 210 includes a short range communication module and may further include a wireless communication module and a wired communication module.

The communication unit 210 may receive the position of the information providing apparatus 20 through communication with the ITS or may also receive the position of the information providing apparatus 20 through a Global Navigation Satellite System (GNSS), a Differential Global Positioning System (DGPS), or a Carrier-phase DGPS (CDGPS) signal. In addition, the communication unit 210 may estimate the position of the information providing apparatus 20 through the short range wireless network communication. A received signal strength indicator (RSSI), a time of flight (ToF), a time difference of arrival (TDoA), and the like may be used for the position estimation.

The bio-signal receiving unit 220 is a component that receives a user's bio-signal. Here, the bio-signal may detect the brain wave information, the blood flow information, the blood pressure information, the oxygen saturation, the carbon dioxide partial pressure, the pulsation, the respiration rate, the respiratory volume, and the like of the user.

The bio-signal receiving unit 220 transmits the user bio-signal to the control unit 240, and thus, the control unit 240 may analyze the emotional state of the user.

The shock sensing unit 230 is a component that detects a shock when the information providing apparatus 20 collides with an object. The shock sensing unit 230 notifies the control unit 240 of whether the shock is detected when the user wearing the information providing apparatus 20 falls or collides with an object.

The control unit 240 is a component that generates first information and second information according to the output mode that is any one of the normal mode, the safe mode, or the emotional mode. The control unit 240 also controls the first information to be output to the user through the output unit 200 and controls the second information to be output to the outside of the information providing apparatus.

The control unit 240 according to the embodiment of the present disclosure may determine the output mode of the information providing apparatus 20 based on the position of the information providing apparatus 20. Hereinafter, each mode is described.

The normal mode is a mode in which traffic information is provided to a user for smooth driving of the PM vehicle and advertisement information is provided to others for marketability and profitability. According to the embodiment of the present disclosure, when the information providing apparatus 20 is positioned on a road, the control unit 240 may determine that the output mode is the normal mode.

In the normal mode, the control unit 240 may estimate the position of the information providing apparatus 20 through the communication unit 210 and receive the traffic information and the advertisement information from the ITS.

Here, the traffic information includes at least one of a traffic flow, a traffic signal, a traffic sign, event information, or a navigation route. The event information refers to event information that abruptly hinders the traffic flow due to traffic control, drunk driving enforcement, and the like. Meanwhile, the advertisement information may include commercial area information designated by the ITS, content information retrieved according to a user's interest, and the like. In other words, the advertisement information includes all information set in exchange for advertisement fees. According to the embodiment of the present disclosure, a portion of the advertisement fee may be paid to a user in exchange for providing advertisement information to others.

The control unit 240 may generate a virtual map to which the estimated position of the information providing apparatus 20 and the traffic information are mapped as first information and may generate the advertisement information as the second information. The output unit 200 provides the first information to the user and outputs the second information to the outside of the information providing apparatus 20.

Meanwhile, the safety mode is a mode in which surrounding pedestrian information, moving object information, and accident information are provided to the user for the safety of the user and the biometric information of the user is provided to others in order to prepare for an emergency situation. According to the embodiment of the present disclosure, when the information providing apparatus 20 is positioned on a sidewalk, the control unit 240 may determine that the output mode is the safe mode.

In the safe mode, the bio-signal receiving unit 220 receives the user's bio-signal and the shock sensing unit 230 detects a shock. The control unit 240 receives surrounding information including at least one of the pedestrian information, the moving object information, or the accident information from the ITS.

The control unit 240 generates the surrounding information as the first information and generates the bio-signal as the second information. The output unit 200 provides the surrounding information to the user and outputs the user's biometric information to the outside or to others. A user may prevent a collision through the surrounding information. Even if a user falls into an emergency state due to a collision, others may quickly identify the user's biometric information and perform first aid.

According to an embodiment of the present disclosure, in the safe mode, the control unit 240 may calculate a shock notification criterion based on at least one of the user's bio-signal or the pre-stored biometric information and transmit a warning message to the ITS when a degree of the shock detected by the shock sensing unit 230 exceeds a shock notification criterion. When the RSU included in the intelligent transportation system receives the warning message, the RSU notifies an emergency center of a nearby hospital of whether an accident has occurred. On the other hand, when the RSU does not receive the warning message, the RSU may transmit an alternative warning message to a management server. In detail, even when the ITS detects the shock of the information providing apparatus using a sensing device, such as a camera, when the RSU does not receive the warning message, the RSU generates an alternative warning message and transmits the generated alternative warning message to the management server instead.

Meanwhile, the shock notification criterion may be set differently according to an age, a gender, or the like of a user specified according to the user's bio-signal and biometric information.

The emotional mode is a mode in which emotional states of others are provided to a user for smooth communication and the emotional state of the user is provided to others. According to the embodiment of the present disclosure, when the information providing apparatus 20 is positioned in a preset area, the control unit 240 may determine that the output mode is the emotional mode.

In the emotional mode, the control unit 240 may analyze the emotional state of the user based on the received bio-signal or the pre-stored biometric information and receive the emotional states of others from terminals of others.

Here, the emotional state includes states, such as joy, anger, love, sadness, pleasure, despondency, depression, and the like.

The control unit 240 generates the emotional states of others as the first information and generates the emotional state of the user as the second information. The output unit 200 provides the emotional states of others to the user and provides the emotional state of the user to the outside or others. The user and others may communicate smoothly by identifying each other's emotional state in advance.

The control unit 240 according to the embodiment of the present disclosure may determine the output mode of the information providing apparatus 20 based on the speed of the information providing apparatus 20. In this case, the information providing apparatus 20 may further include a speed measuring unit (not illustrated) for measuring the speed.

Figure 3:
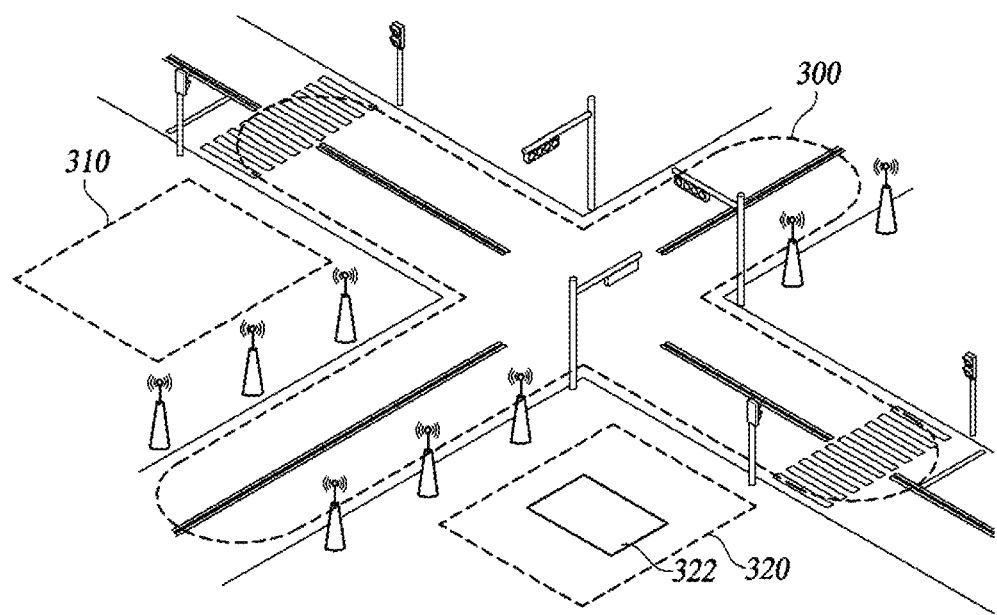
FIG. 3 is a diagram for describing a configuration in which an output mode is determined based on a position of the information providing apparatus according to the embodiment of the present disclosure.

FIG. 3 is a diagram for describing a configuration in which an output mode is determined based on a position of the information providing apparatus according to the embodiment of the present disclosure.

Referring to FIG. 3, a road 300, a sidewalk 310, a preset area 320, and a preset position 322 are illustrated.

Hereinafter, it is described that a user wearing the information providing apparatus may travel on all of the road 300, the sidewalk 310, and the preset area 320 using a PM vehicle.

According to an embodiment of the present disclosure, it is determined that the output mode can be the normal mode when the information providing apparatus is positioned on the road 300, can be the safe mode when the information providing apparatus is positioned on the sidewalk 310, and can be the emotional mode when the information providing apparatus is positioned in the preset area 320.

The road 300 mainly refers to a road on which a vehicle travels. The PM vehicle may travel smoothly on the road 300 compared to the sidewalk 310. When the PM vehicle, i.e., the information providing apparatus, is positioned on the road 300, traffic information may be provided to a user for smooth traveling. On the other hand, advertisement information may be provided to others. Like advertisement attached to a bus or a taxi, the information providing apparatus may provide the advertisement information to others.

The sidewalk 310 mainly refers to a road on which pedestrians move. The PM vehicle needs to travel at a slower speed on the sidewalk 310 compared to the road 300. When the information providing apparatus is positioned on the sidewalk 310, the information providing apparatus may provide surrounding information to a user to prevent a collision. Specifically, the information providing apparatus may provide surrounding pedestrian information, moving object information, and accident information to a user. Here, the moving object information means mobility capable of moving the sidewalk 310. Meanwhile, the information providing apparatus may provide a user's bio-signal on the sidewalk 310. When a user is in an emergency situation, this is for others to identify the user's biometric information and perform first aid.

The preset area 320 means an area preset by the user. Specifically, the preset area 320 may be an area for exchanging an emotional state between the user and others. For example, when the preset position 322 is a user's home, the preset area 320 may be an area around a house. When the user and others are family members, the user may identify emotional states of others through the information providing apparatus and others may also identify the emotional state of the user through the information providing apparatus. As a result, the user of the information providing apparatus and others can communicate and exchange emotions smoothly.

Figure 4A:
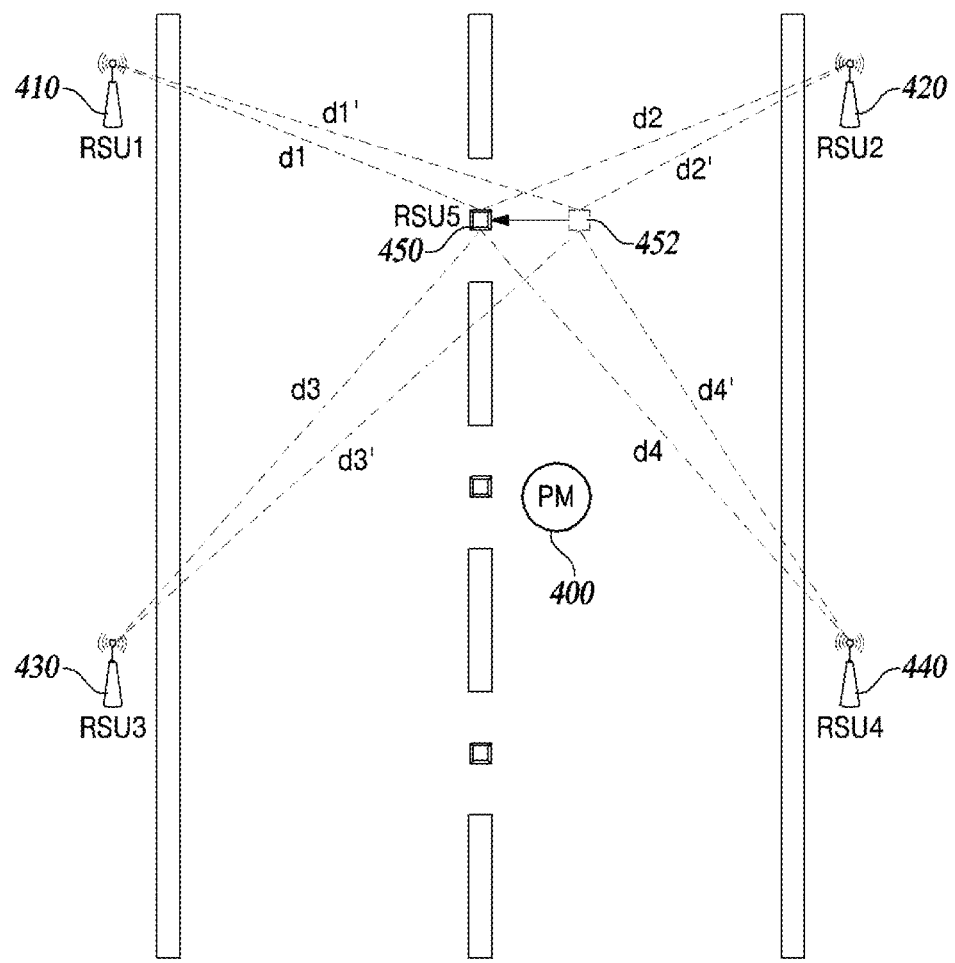
FIGS. 4A and 4B are diagrams for describing an operation of estimating an accurate position of the information providing apparatus according to the embodiment of the present disclosure.
Figure 4B:
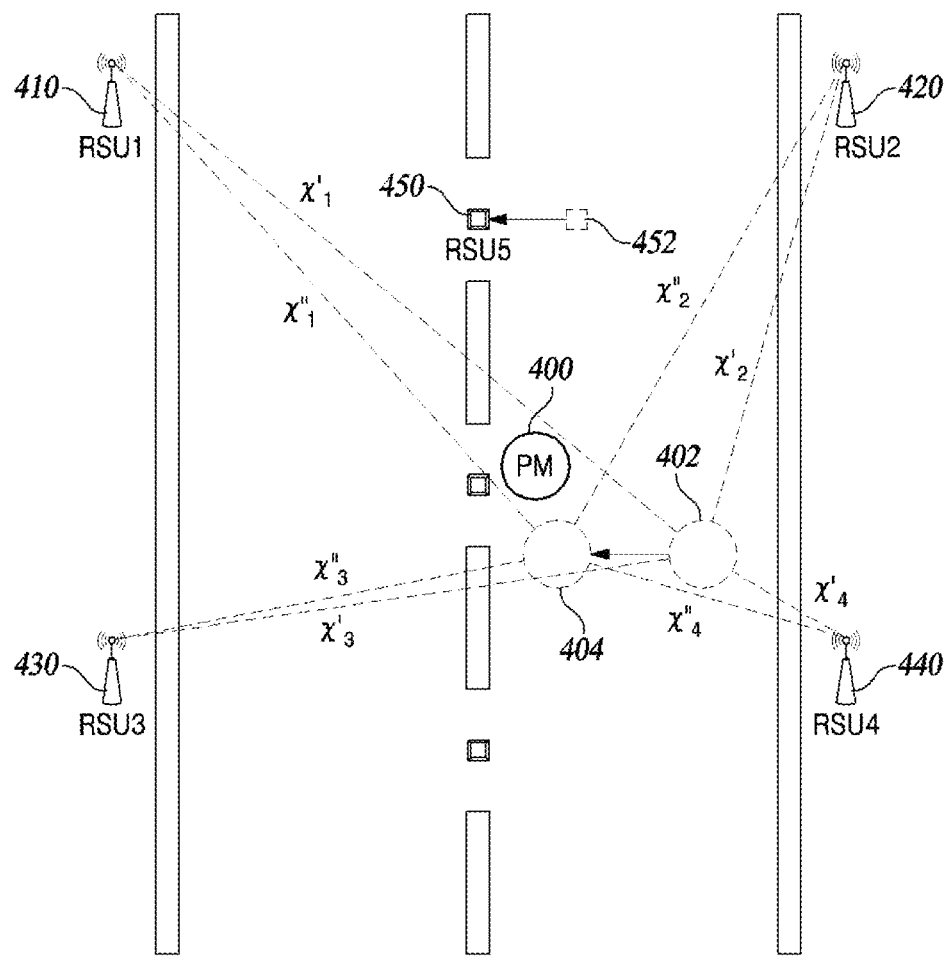

FIGS. 4A and 4B are diagrams for describing a process of estimating an accurate position of a PM vehicle according to an embodiment of the present disclosure.

In detail, FIG. 4A is a diagram for describing a process of generating correction data. FIG. 4B is a diagram for describing a process of correcting the candidate position of the PM vehicle based on the correction data.

The information providing apparatus according to the embodiment of the present disclosure may estimate its own position by using a RSU or a base station of an ITS. In particular, it is possible to estimate the position of the information providing apparatus based on a reference RSU or a reference base station. Specifically, the information providing apparatus transmits the information received from the RSUs to the management server. The management server estimates the position of the information providing apparatus and then transmits the estimated position to the information providing apparatus.

Hereinafter, it is assumed that the user of the PM vehicle wears the information providing apparatus and the position of the PM vehicle is regarded as the position of the information providing apparatus.

Referring to FIG. 4A, an actual position 400 of a PM vehicle, a plurality of RSUs 410, 420, 430, 440, and 450, and an estimated position 452 of a fifth RSU are illustrated. The plurality of RSUs are referred to the auxiliary RSUs 410, 420, 430, and 440 and the fifth RSU 450. The auxiliary RSUs are referred to the first RSU 410, the second RSU 420, the third RSU 430, and the fourth RSU 440. FIG. 4B additionally illustrates an estimated position 402 of the PM vehicle and a corrected position 404 of the PM vehicle.

Hereinafter, the fifth RSU 450 is described as a reference RSU for correction of the estimated position, but this is only one embodiment. The reference RSU may be implemented by at least one of the first RSU 410, the second RSU 420, the third RSU 430, or the fourth RSU 440. Meanwhile, the auxiliary RSUs 410, 420, 430, and 440 are only an embodiment and may be constituted as at least three of the auxiliary RSUs. Position coordinates for the plurality of RSUs 410, 420, 430, 440, and 450 are assumed to be known in advance.

Hereinafter, it is described that the management server generates correction data. However, the correction data can be generated by another device or the reference RSU. At this time, the reference RSU may be set to store and transmit the correction data.

The fifth RSU 450 receives messages from the auxiliary RSUs 410, 420, 430, and 440. The management server calculates the distances between the fifth RSU 450 and the auxiliary RSUs 410, 420, 430, 440 based on at least one of the RSSI (Received Signal Strength Signal) or the ToF (Time-of-Flight) of the messages received by the fifth RSU 450, and the positions of the auxiliary RSUs 410, 420, 430, and 440. At this time, the known positions of the auxiliary RSUs 410, 420, 430, and 440 are utilized.

Based on the distances between the fifth RSU 450 and the auxiliary RSUs 410, 420, 430, and 440, the management server may derive the estimated position 452 of the fifth RSU.

However, the actual position and the estimated position 452 of the fifth RSU may not be matched due to a signal distortion due to weather or obstacles, errors in the RSU, and the like. By obtaining, however, an error between the known actual position and the estimated position 452 of the fifth RSU and using the previously obtained error as the positioning correction data of the PM vehicle, the management server can accurately derive the actual position 400 of the PM vehicle.

In particular, the management server may accurately derive the actual position 400 of the PM vehicle using correction data including any one of a distance error ratio, a distance error, or a position error of the fifth RSU 450.

Hereinafter, a process of generating correction data in the order of a distance error ratio, a distance error, and a position error, and correcting the position of the PM vehicle using the correction data is described.

As a first embodiment, in order to use the distance error ratio, the management server calculates a distance $d_1'$ between the estimated position 452 of the fifth RSU and the position of the first RSU 410 based on at least one of the RSSI or the ToF of the messages received by the fifth RSU 450. The management server further calculates a distance d1 between the actual position of the fifth RSU 450 and the position of the first RSU 410.

The management server calculates an error ratio (hereinafter, a first distance error ratio) between $d_1$ and $d_1'$. Here, the distance error ratio means the ratio of the actual distance to the estimated distance. In other words, the distance error ratios are the actual distances over the estimated distances. For example, the first distance error ratio means a ratio of $d_1$ to $d_1'$. Additionally, the management server calculates each of a second distance error ratio, a third distance error ratio, and a fourth distance error ratio for the second RSU 420, the third RSU 430, and the fourth RSU 440, respectively.

Referring to FIG. 4B, the management server may derive the corrected position 404 of the PM vehicle by correcting the estimated position 402 of the PM vehicle using the distance error ratio.

Specifically, the PM vehicle receives messages from the auxiliary RSUs 410, 420, 430, and 440. The management server may estimate the estimated position 402 of the PM vehicle based on at least one of the RSSI or the ToF of the messages received by the PM vehicle. In detail, the management server calculates the estimated position 402 of the PM vehicle through the triangulation or the trilateration based on at least three positions of the auxiliary RSUs 410, 420, 430, or 440, and the RSSI or the ToF of the messages received from three RSUs.

The management server obtains the distances between the estimated position 402 of the PM vehicle and the positions of the auxiliary RSUs 410, 420, 430, and 440. The distances from the estimated position 402 of the PM vehicle to the positions of the auxiliary RSUs 410, 420, 430, and 440 are x1', x2', x3', and x4', respectively.

Thereafter, the management server may calculate the distance error ratios that are the correction data. The distance error ratios mean distance error ratios from the fifth RSU 450 to the auxiliary RSUs 410, 420, 430, and 440.

The management server may obtain the corrected distances by multiplying the distance error ratio by the distances between the estimated position 402 of the PM vehicle and the positions of the auxiliary RSUs 410, 420, 430, and 440. For example, the management server may obtain x1" by multiplying $(d_1/d_1')$ by x1'. Additionally, the management server may further obtain x2", x3", and x4".

The corrected distances from the estimated position 402 of the PM vehicle to the positions of the auxiliary RSUs 410, 420, 430, and 440 may be expressed as in Equation 1.

$$x'' = x' \times \frac{d}{d'} \qquad \text{[Equation 1]}$$

In Equation 1, x" denotes the corrected distance from the estimated position 402 of the PM vehicle to the positions of the auxiliary RSUs 410, 420, 430, and 440. Also, x' denotes the distance from the estimated position 402 of the PM vehicle to the auxiliary RSUs 410, 420, 430, and 440. Further, d denotes the distance from the actual position of the fifth RSU 450 to the positions of the auxiliary RSUs 410, 420, 430, and 440. Lastly, d' denotes the distance from the estimated position 452 of the fifth RSU to the positions of the auxiliary RSUs 410, 420, 430, and 440.

The management server may calculate the corrected position 404 of the PM vehicle through the triangulation or the trilateration based on at least three of x1", x2", x3", or x4". Since the error between the actual distance and the estimated distance from the fifth RSU 450 to the auxiliary RSUs 410, 420, 430, and 440 is reflected in the estimated position 402 of the PM vehicle, the corrected position 404 of the PM vehicle is derived to be closer to the actual position 400 of the PM vehicle than the estimated position 402 of the PM vehicle.

The management server according to the embodiment of the present disclosure may correct the estimated position 402 of the PM vehicle using the error ratio for one of the RSSI or the ToF instead of the distance.

As a second embodiment, the management server may calculate the distance errors as the correction data. The distance errors mean distance errors between the fifth RSU 450 and the auxiliary RSUs 410, 420, 430, and 440.

In order to use the distance error, the management server calculates an error (hereinafter, a first distance error) between $d_1$ and $d_1'$. Specifically, the first distance error means a value obtained by subtracting $d_1'$ from $d_1$. Additionally, the management server calculates each of the second distance error, the third distance error, and the fourth distance error for the second RSU 420, the third RSU 430, and the fourth RSU 440.

Referring to FIG. 4B, the management server may derive the corrected position 404 of the PM vehicle by correcting the estimated position 402 of the PM vehicle using the distance error.

Specifically, the PM vehicle receives messages from the auxiliary RSUs 410, 420, 430, and 440. The management server may estimate the estimated position 402 of the PM vehicle based on at least one of the RSSI or the ToF of the messages by the PM vehicle. In detail, the management server calculates the estimated position 402 of the PM vehicle through the triangulation or trilateration based on at least three positions of the auxiliary RSUs 410, 420, 430, or 440, and the RSSI or the ToF of the messages received from three RSUs. In this case, the distances between the estimated position 402 of the PM vehicle and the positions of the auxiliary RSUs 410, 420, 430, and 440 are x1', x2', x3', and x4', respectively.

The management server may obtain the respective corrected distances by adding the distance error to the distances from the estimated position 402 of the PM vehicle to the positions of the auxiliary RSUs 410, 420, 430, and 440. For example, the management server may obtain x1" by adding $(d_1-d_1')$ to x1'. Additionally, the management server may further obtain x2", x3", and x4".

The distances from the estimated position 402 of the PM vehicle to the positions of the auxiliary RSUs 410, 420, 430, and 440 may be expressed as in Equation 2.

$$x''=x'+(d-d') \quad \text{[Equation 2]}$$

The management server may calculate the corrected position 404 of the PM vehicle through the triangulation or trilateration based on at least three of x1", x2", x3", or x4". Since the error between the actual distance and the estimated distance from the fifth RSU 450 to the auxiliary RSUs 410, 420, 430, and 440 is reflected in the estimated position 402 of the PM vehicle, the corrected position 404 of the PM vehicle may be closer to the actual position 400 of the PM vehicle than the estimated position 402 of the PM vehicle.

The management server according to the embodiment of the present disclosure may correct the estimated position 402 of the PM vehicle using the error ratio for one of the RSSI or the ToF instead of the distance.

As a third embodiment, the management server may calculate the position errors as the correction data. The position error means a difference between the estimated position 452 and the actual position of the fifth RSU 450. Otherwise, the management server calculates a position error meaning the difference between the actual position of the fifth RSU 450 and the estimated position 452 of the fifth RSU. Here, the position may mean two-dimensional position coordinates or three-dimensional position coordinates. The position error is calculated by calculations for each dimension.

After estimating the estimated position 402 of the PM vehicle, the management server may derive the corrected position 404 of the PM vehicle by correcting the estimated position 402 of the PM vehicle based on the position error for the fifth RSU 450. Specifically, each of the corrections may be performed by dividing the estimated position 402 of the PM vehicle into an x coordinate and a y coordinate.

Meanwhile, the management server may receive the distance error ratio, the distance error, and the position error between the fifth RSU 450 and the auxiliary RSUs 410, 420, 430, and 440 in real time or may calculate and store, in advance, the distance error ratio, the distance error, and the position error.

Through the above-described three error corrections, the management server may derive the accurate position of the PM vehicle.

Figure 5:
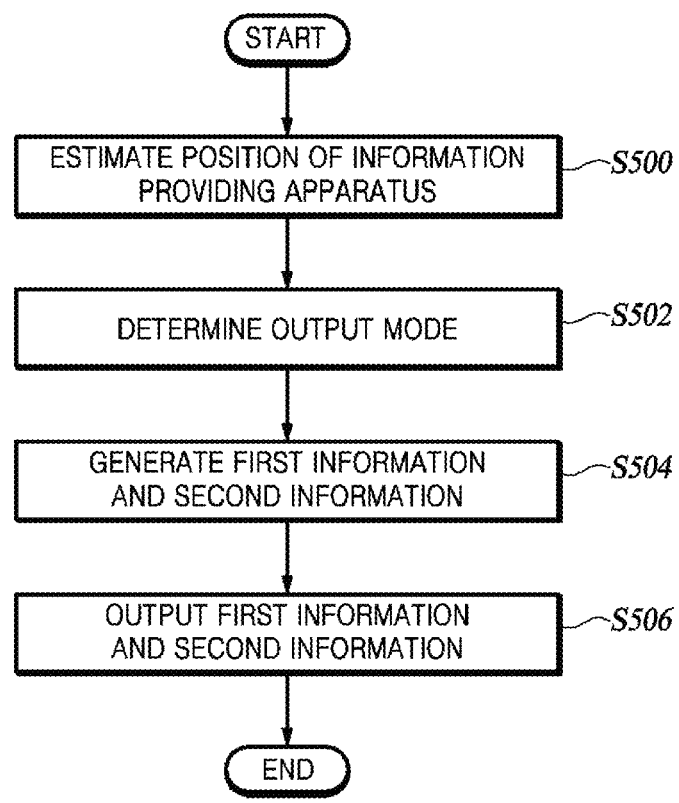
FIG. 5 is a flowchart illustrating a method of controlling an information providing apparatus according to an embodiment of the present disclosure.

FIG. 5 is a flowchart illustrating a method of controlling an information providing apparatus according to an embodiment of the present disclosure.

Referring to FIG. 5, the information providing apparatus estimates the position of the information providing apparatus (S500).

According to an embodiment of the present disclosure, the information providing apparatus may receive a position through communication with an ITS or may receive a position through a GNSS signal. In addition, the information providing apparatus may estimate a position through short range wireless network communication.

The information providing apparatus determines an output mode based on the position of the information providing apparatus (S502).

According to an embodiment of the present disclosure, it is determined that the output mode can be a normal mode when the information providing apparatus is positioned on a road, can be a safe mode when the information providing apparatus is positioned on a sidewalk, and can be an emotional mode when the information providing apparatus is positioned in a preset area.

The information providing apparatus generates first information and second information according to the output mode that is any one of the normal mode, the safe mode, or the emotional mode (S504).

When the information providing apparatus determines that the output mode is the normal mode, the information providing apparatus receives traffic information and advertisement information from the ITS, generates a virtual map to which the estimated position and the traffic information are mapped as the first information, and generates the advertisement information as the second information. Here, the traffic information may include at least one of a traffic flow, a traffic signal, a traffic sign, event information, or a navigation route.

When the information providing apparatus determines that the output mode is the safe mode, the information providing apparatus receives surrounding information, which includes at least one of pedestrian information, moving object information, or accident information from the ITS, generates the surrounding information as the first information, and generates a bio-signal as the second information.

When the information providing apparatus determines that the output mode is the emotional mode, the information providing apparatus analyzes the emotional state of the user based on the bio-signal, receives the emotional states of others from terminals of others, generates the emotional states of others as the first information, and generates the emotional state of the user as the second information.

The information providing apparatus outputs the first information to the user and outputs the second information to the outside of the information providing apparatus (S506).

According to an embodiment of the present disclosure, in the safe mode, the information providing apparatus may calculate a shock notification criterion based on at least one of the user's bio-signal or the pre-stored biometric information, detect the shock, and transmit a warning message to the ITS when a degree of the detected shock exceeds the shock notification criterion. In this case, when the RSU included in the ITS does not receive the warning message, the RSU may transmit an alternative warning message to the management server.

Although it is described in FIG. 5 that operations S500 to S506 are sequentially executed, this is merely illustrates the technical idea of an embodiment of the present disclosure. In other words, those having ordinary skill in the technical field to which an embodiment of the present disclosure belongs may change the order described in FIG. 5 within a range that does not deviate from the essential characteristics of an embodiment of the present disclosure. Alternatively, those having ordinary skill in the technical field may apply various modifications and variations to executing one or more of the operations S500 to S506 in parallel. Thus, FIG. 5 is not limited to a time-series order. The above modifications and variations should be within the scope of the present disclosure.

Meanwhile, the operations illustrated in FIG. 5, as well as the apparatus including the various units depicted in FIGS. 1 and 2, can be implemented as computer-readable codes on a computer-readable recording medium. The computer readable recording medium may include all kinds of recording apparatuses in which data that may be read by a computer system is stored. In other words, the computer-readable recording medium may be a non-transitory medium, such as a read-only memory (ROM), a random-access memory (RAM), a compact disc (CD)-ROM, a magnetic tape, a floppy disk, and an optical data storage device. The computer-readable recording medium may further include a transitory medium, such as a carrier wave (for example, transmission over the Internet) and a data transmission medium. In addition, the computer readable recording media may be distributed in computer systems connected to each other through a network such that the computer readable codes may be stored and executed in the computer readable recording media in a distributed scheme.

In addition, components of the present disclosure may use an integrated circuit structure, such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, or the like that perform respective functions. In addition, components of the present disclosure may store instructions executed by one or more processors in one or more memories.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure is not to be limited by the above explicitly described embodiments but by the claims and equivalents thereof.

As described above, according to an embodiment of the present disclosure, it is possible to improve user convenience and satisfaction by outputting information according to various modes of an information providing apparatus and providing different information to a user and others.

According to another embodiment of the present disclosure, it is possible to increase driving performance in a normal mode, safety in a safe mode, and marketability in an emotional mode by setting a mode of an information providing apparatus to one of the normal mode, the safe mode, and the emotional mode according to a position of the information providing apparatus and by providing information according to each mode.

What is claimed is:

1. An information providing apparatus comprising:
at least one memory storing computer-executable instructions; and
at least one processor,
wherein the at least one processor is configured to execute the computer-executable instructions to
generate first information and second information according to an output mode that is any one mode of a normal mode, a safe mode, or an emotional mode, control the first information to be output to a user, and control the second information to be output to others,
wherein, when it is determined that the output mode is the safe mode, the at least one processor is configured to calculate a shock notification criterion based on at least one of a bio-signal of the user or pre-stored biometric information, and
transmit a warning message to an intelligent transport system (ITS) when a degree of a shock applied to the information providing apparatus exceeds the shock notification criterion,
wherein the at least one processor is configured to determine that the output mode is the normal mode when the information providing apparatus is positioned on a road, and determine that the output mode is the safe mode when the information providing apparatus is positioned on a sidewalk,
wherein, when it is determined that the output mode is the normal mode, the at least one processor is configured to estimate a position of the information providing apparatus, receive traffic information and advertisement information from the ITS, and generate a virtual map to which the estimated position and the traffic information are mapped as the first information and generate the advertisement information as the second information, and wherein, when it is determined that the output mode is the safe mode, the at least one processor is configured to receive surrounding information including at least one of pedestrian information, moving object information, or accident information from the ITS, generate the surrounding information as the first information, and generate the bio-signal of the user as the second information.

2. The information providing apparatus of claim 1, wherein the at least one processor is configured to determine that the output mode is the emotional mode when the information providing apparatus is positioned in a preset area.

3. The information providing apparatus of claim 1, wherein the traffic information includes at least one of a traffic flow, a traffic signal, a traffic sign, event information, or a navigation route.

4. The information providing apparatus of claim 1, wherein the ITS includes a road side unit, and
when the warning message is not received, the road side unit is configured to transmit an alternative warning message to a management server.

5. The information providing apparatus of claim 1,
wherein, when it is determined that the output mode is the emotional mode, the at least one processor is configured to analyze an emotional state of the user based on the bio-signal of the user, receive an emotional state of the others from a terminal of the others, generate the emotional state of the others as the first information, and generate the emotional state of the user as the second information.

6. The information providing apparatus of claim 1, wherein the information providing apparatus includes any one of a terminal, a smartphone, a wearable device, or a helmet.

7. A method of operating an information providing apparatus, the method comprising:
generating first information and second information according to an output mode that is any one of a normal mode, a safe mode, or an emotional mode; and
outputting the first information to a user and outputting the second information to others; and
when it is determined that the output mode is the safe mode,
receiving a bio-signal of the user,
calculating a shock notification criterion based on at least one of the bio-signal of the user or pre-stored biometric information,
detecting a shock applied to the information providing apparatus, and
transmitting a warning message to an intelligent transport system (ITS) when a degree of the detected shock exceeds the shock notification criterion, wherein the method further comprises determining the output mode based on a position of the information providing apparatus,
wherein, in the determining, it is determined that the output mode is the normal mode when the information providing apparatus is positioned on a road, and the output mode is the safe mode when the information providing apparatus is positioned on a sidewalk,
wherein, when it is determined that the output mode is the normal mode, the generating of the first information and the second information includes:
estimating a position of the information providing apparatus;
receiving traffic information and advertisement information from the ITS; and
generating a virtual map in which the estimated position and the traffic information are mapped as the first information and generating the advertisement information as the second information, and
wherein, when it is determined that the output mode is the safe mode, the generating of the first information and the second information includes:
receiving a bio-signal of the user;
receiving surrounding information including at least one of accident information, pedestrian information, or moving object information from the ITS; and
generating the surrounding information as the first information and generating the bio-signal of the user as the second information.

8. The method of claim 7, wherein, in the determining, it is determined that the output mode is the output mode is the emotional mode when the information providing apparatus is positioned in a preset area.

9. The method of claim 7, wherein the traffic information includes at least one of a traffic flow, a traffic signal, a traffic sign, event information, or a navigation route.

10. The method of claim 7, wherein the ITS includes a road side unit, and
when the warning message is not received, the road side unit is configured to transmit an alternative warning message to a management server.

11. The method of claim 7, wherein, when it is determined that the output mode is the emotional mode, the generating of the first information and the second information includes:
receiving a bio-signal of the user;
analyzing an emotional state of the user based on the bio-signal of the user;
receiving an emotional state of the others from a terminal of the others; and
generating the emotional state of the others as the first information and generating the emotional state of the user as the second information.

* * * * *